US008091429B2

(12) United States Patent
Land, III

(10) Patent No.: US 8,091,429 B2
(45) Date of Patent: Jan. 10, 2012

(54) APPARATUS AND METHOD FOR HIGH FREQUENCY LOW PRESSURE ARC FLASH SENSOR

(75) Inventor: H. Bruce Land, III, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 22 days.

(21) Appl. No.: 12/855,200

(22) Filed: Aug. 12, 2010

(65) Prior Publication Data

US 2011/0036175 A1 Feb. 17, 2011

Related U.S. Application Data

(60) Provisional application No. 61/233,873, filed on Aug. 14, 2009.

(51) Int. Cl.
*G01L 9/00* (2006.01)
*H02H 3/00* (2006.01)

(52) U.S. Cl. ............................ 73/705; 361/115; 356/56

(58) Field of Classification Search ........................ None
See application file for complete search history.

(56) References Cited

U.S. PATENT DOCUMENTS

| | | | |
|---|---|---|---|
| 3,852,547 | A | 12/1974 | Dietz |
| 4,254,314 | A | 3/1981 | Kummerow et al. |
| 4,328,651 | A | 5/1982 | Gutierrez |
| 4,347,414 | A | 8/1982 | Headley et al. |
| 4,375,022 | A | 2/1983 | Daussin et al. |
| 4,433,219 | A | 2/1984 | Dietz |
| 4,517,425 | A | 5/1985 | Martin |
| 4,658,322 | A | 4/1987 | Rivera |
| 4,894,497 | A | 1/1990 | Lycan |
| 5,589,673 | A | 12/1996 | Lehmann et al. |
| 5,878,905 | A | 3/1999 | Gronbach et al. |
| 6,522,252 | B2 | 2/2003 | Horibe et al. |
| 6,812,713 | B2 | 11/2004 | Cuk et al. |
| 7,379,555 | B2 | 5/2008 | Gable et al. |
| 7,821,749 | B2 * | 10/2010 | Asokan et al. .................... 361/1 |
| 8,040,517 | B1 * | 10/2011 | Wu et al. ....................... 356/432 |
| 2008/0239592 | A1 * | 10/2008 | Roscoe et al. .................... 361/7 |
| 2008/0239598 | A1 * | 10/2008 | Asokan et al. .................. 361/56 |

* cited by examiner

*Primary Examiner* — Andre Allen
(74) *Attorney, Agent, or Firm* — Noah J. Hayward

(57) ABSTRACT

A pressure sensor for detecting an electric arc in an electrical switchboard, the sensor being in an enclosed case containing a conical opening, the case being placed in the switchboard. A pressure switch in the sensor is attached to the interior of the case and is electrically connected to a circuit board for transmitting a signal when a contact in the pressure switch is closed. When a pressure wave created by the electric arc enters the case through the conical opening it forces a contact on the pressure switch to close thereby completing a circuit with the circuit board which transmits the signal to, for example, a central processor, to turn off the source of electricity thereby quenching the electric arc.

11 Claims, 1 Drawing Sheet

APPARATUS AND METHOD FOR HIGH FREQUENCY LOW PRESSURE ARC FLASH SENSOR

CROSS-REFERENCE TO RELATED APPLICATIONS

This application relates to U.S. provisional application No. 61/233,873, filed on Aug. 14, 2009, which is incorporated herein by reference in its entirety.

BACKGROUND OF THE INVENTION

The present invention relates to a sensor system and method for detecting electric arcs and, more specifically, to a low cost, small and fast response sensor capable of detecting the leading edge of the pressure wave generated by a high power electric arc.

Air around high power electric arcs is rapidly heated to over 10,000 degrees. This heat causes the air to expand rapidly. The expanding air creates a shock wave of pressure that emanates from the arc. As a high powered arc moves it pushes plasma and air at velocities measured at over 800 miles per hour which exceeds the speed of sound. It is desirable that the pressure wave be detected on its leading edge while the pressure is still at a low level as these pressures are known to reach levels that have knocked down cement block walls.

While, as noted above, the pressures from the arc can be quite high, the pressure oscillates up and down quite rapidly due to the rapid motion of the arc. Detection of this pressure wave can be used to identify the presence of the arc.

Pressure sensors such as pressure transducers and pressure switches detect pressure due to the motion in a diaphragm. The motion of the diaphragm is a function of the total force on the diaphragm and the flexibility of the diaphragm. The total force on the diaphragm is a function of pressure (pounds per square inch or PSI) times area of the diaphragm. If very low pressures need to be detected then a large area diaphragm is needed to accumulate enough force to cause the diaphragm to move. The use of a large area greatly slows the response time of the pressure sensor. Thus, if the pressure sensor diaphragm is made large enough to detect the low pressure leading edge of the arc pressure wave, it may incur so much inertia that it will not respond to the rapidly varying arc pressure.

Some of the arc fault detection systems presently on the market open breakers based solely on the light from the arc. Unfortunately, flashlights and strobe lights can also set off photo detectors. An arc flash pressure sensor used in conjunction with arc light sensors provides a more robust arc detection system preventing false alarms from opening breakers and the loss of power at inopportune times.

What is needed then is a low cost, small, fast response pressure sensor capable of detecting the leading edge of the arc-generated pressure wave.

SUMMARY OF THE INVENTION

Therefore, the present invention has been made in view of the above problems and constraints, and provides an apparatus and method to achieve the above objectives.

More specifically, the present invention is directed to a pressure sensor comprising: an enclosed case containing an opening wherein the opening in the case is conical in shape, the opening on the exterior face of the case being larger than the opening on the interior face of the case thereby allowing the air to enter the case more easily than the air can exit the case through the opening; a pressure switch attached to the interior of the case; and means for transmitting a signal when a contact in the pressure switch is closed, the transmitting means electrically connected to the pressure switch; whereby air comprising a pressure wave enters the case through the opening forcing a contact on the pressure switch to close thereby completing a circuit with the transmitting means and transmitting the signal.

The present invention is further directed to a pressure sensor for detecting an electric arc in an electrical switchboard comprising: an enclosed case containing an opening, the case being placed in the switchboard wherein the opening in the case is conical in shape, the opening on the exterior face of the case being larger than the opening on the interior face of the case thereby allowing the air to enter the case more easily than the air can exit the case through the opening; a pressure switch attached to the interior of the case; means for transmitting a signal when a contact in the pressure switch is closed, the transmitting means electrically connected to the pressure switch; and means for receiving the signal and turning off the source of electricity; whereby air comprising a pressure wave created by the electric arc enters the case through the opening forcing a contact on the pressure switch to close thereby completing a circuit with the transmitting means and transmitting the signal to the receiving means to turn off the source of electricity and quench the electric arc.

The present invention is further directed to a method for detecting an electric arc inside an electrical switchboard using a pressure sensor, the method comprising: placing an enclosed case containing an opening in the switchboard wherein the opening in the case is conical in shape, the opening on the exterior face of the case being larger than the opening on the interior face of the case thereby allowing the air to enter the case more easily than the air can exit the case through the opening; attaching a pressure switch to the interior of the case; transmitting a signal when a contact in the pressure switch is closed; and receiving the signal and turning off the source of electricity; whereby air comprising a pressure wave created by the electric arc enters the case through the opening forcing a contact on the pressure switch to close thereby completing a circuit and transmitting the signal to turn off the source of electricity and quench the electric arc.

Those and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Reference will now be made in detail to the exemplary embodiments of the present invention, examples of which are illustrated in the accompanying drawings.

Figure 1:
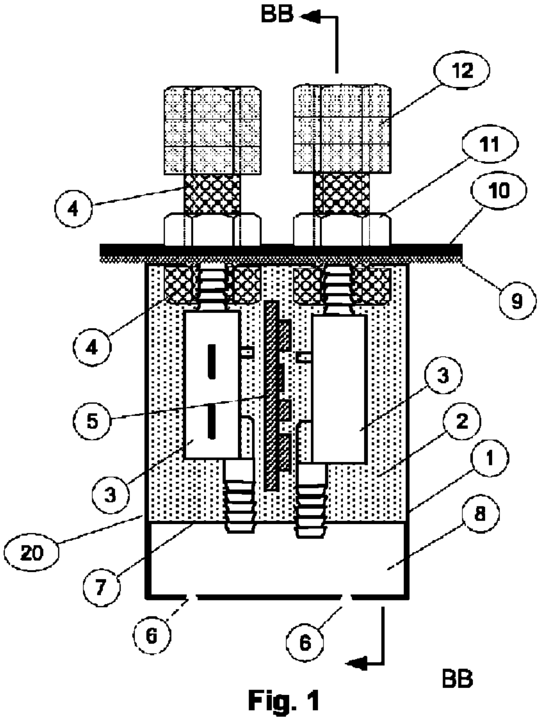
FIG. 1 illustrates a front view of the pressure sensor of the invention.

FIG. 1 shows a front view of the inside of the low cost arc flash pressure sensor 20 of the invention. The pressure sensor is mounted inside of an electrical switchboard to determine if the pressure within the switchboard is rising due to the presence of an arc. Typically the pressure sensor is mounted in the top of the switchboard 10 for convenience. However, since the pressure from the arc will expand to fill the switchboard, the location is not critical. Externally the sensor is composed of a case 1, two protruding bolts 4, two mounting nuts 11, and two contamination protection breather (vent) caps 12. An optional gasket or double sided adhesive 9 can be used to give a weather tight seal between the sensor case 1 and the switchboard surface 10.

Pressure from the arc within the switchboard will enter the conical shaped openings 6 filling the empty cavity/volume 8 which is formed by the top of the plastic case 1 and the surface 7 of the potting 2. The pressure will then enter the pressure switch 3 at the high side 17, FIG. 2. The pressure switch 3 is a standard, commercial, off-the-shelf model: Design Flex PSF100A by World Magnetics; however, any similar type pressure switch will work in the invention. If the pressure against the diaphragm inside of the pressure switch 3 exceeds the spring constant of the pressure switch, the switch contacts will close, completing a circuit via wires 15 from the pressure switch 3 to the printed circuit board 5. See FIG. 3, a bottom view of FIG. 2 along line AA-AA. The signal from the pressure switch 3 is then transmitted to a central processor, via wires 19 and cable 16, that will turn off the source of electricity and quench the arc.

The pressure from the arc varies rapidly, both up and down, with time. A conical opening presents a larger opening in one direction than in the other direction. Therefore, air flow can more easily go from the larger diameter of the cone to the smaller side of the cone rather than flow in the reverse direction. This is similar to the manner in which a diode allows electricity to more easily flow in one direction than in the other direction. In general, if an oscillation voltage (AC) is presented to a diode and a capacitor is placed on the output of the diode, the voltage on the capacitor will rise with time since the diode allows current to flow into capacitor more readily than it allows current to flow out of the capacitor. Similarly, given a sealed volume placed on the output of the small end of the conical opening and an oscillating arc pressure presented to the wide end of the conical opening, the pressure inside of the opening will rise with time. The voltage rise time with a diode and capacitor can be predicted given knowledge of the characteristics of the diode, capacitor, and system losses. Similarly, the pressure rise time of the opening and volume can be controlled by an understanding of the opening, volume and losses.

In the sensor of the invention, the broad exterior face of the conical pressure opening 6 allows air to easily enter the cavity 8. The smaller interior face of the opening 6 slows the exit of the air from the cavity 8. When the rapidly varying arc pressure hits the opening it pumps the pressure in the volume higher. It allows the pressure in the opening to reach a level above the average of the time varying arc pressure and in fact may exceed the peak arc pressure. This allows the pressure switch to operate more rapidly than if it was directly exposed to the arc pressure. Reaction times less than 1 millisecond are important in this scenario. The combination of the conical opening 6 and the cavity 8 results in rectification of the pressure signal and increases the sensitivity of the pressure switch, allowing earlier detection of the arc pressure.

Figure 2:
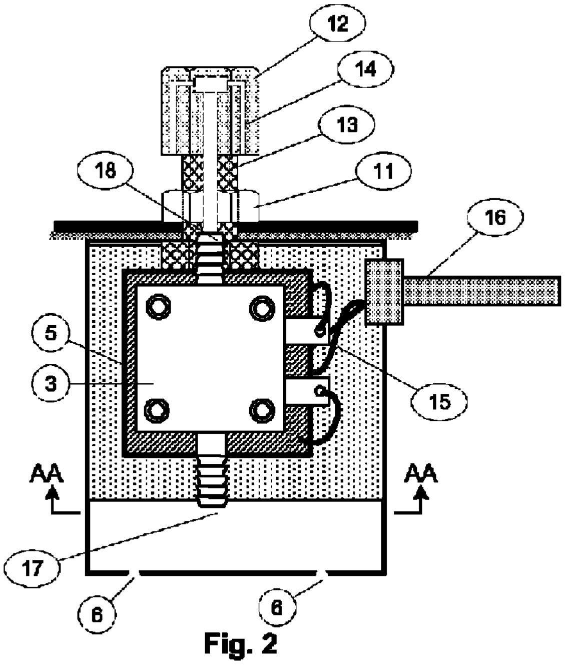
FIG. 2 illustrates a cutaway side view of the pressure sensor of the invention as shown in FIG. 1 along line BB-BB.
Figure 3:
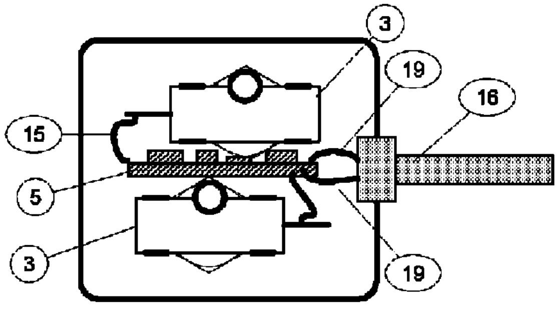
FIG. 3, illustrates, a bottom view of FIG. 2 along line AA-AA.

FIG. 2 shows a cutaway side view of the sensor along line BB-BB. The pressure switch 3 measures the difference in pressure inside of the switchboard with that outside of the switchboard. The pressure inside the switchboard must be higher than the outside pressure by some threshold value to cause completion of the electrical sensing circuit. The use of differential pressure to measure the arc pressure is more reliable than the use of absolute pressure. The arc pressure is preferably detected when it reaches approximately 0.05% of atmospheric pressure. Absolute pressure sensors are prone to drifts larger than the desired pressure threshold and absolute pressure sensors cannot detect the difference between arc pressures and changes in barometric pressure. The use of a differential measurement allows an increase in sensitivity and yet maintains immunity to changes in barometric pressure.

To allow the pressure switch to "see" the pressure outside of the switchboard, the low side 18 of the pressure switch is connected to the mounting bolt 13 which contains a hollow passage. This hollow passage allows outside air to enter the low side of the pressure switch. To protect the pressure switch from water, dust, etc., the outside end of the hollow bolt 13 is covered with a vent cap 12. The vent cap 12 contains multiple small ports 14 which allow air to enter the passage in the bolt 13 and then to reach the pressure switch 3. The diameters of the holes in the vent cap are chosen to interact with the surface tension of water to prevent its entry into the cap. Additionally, the vent ports 14 contain multiple right angles to prevent entry of contamination.

The use of all plastic construction makes this sensor light and easy to mount. It also means that the sensor is electrically inert and can be mounted in close proximity to bare electrical conductors within the switchboard without fear of causing a short.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A pressure sensor comprising:

an enclosed case containing an opening wherein the opening in the case is conical in shape, the opening on the exterior face of the case being larger than the opening on the interior face of the case thereby allowing the air to enter the case more easily than the air can exit the case through the opening;

a pressure switch attached to the interior of the case; and means for transmitting a signal when a contact in the pressure switch is closed, the transmitting means electrically connected to the pressure switch;

whereby air comprising a pressure wave enters the case through the opening forcing a contact on the pressure switch to close thereby completing a circuit with the transmitting means and transmitting the signal.

2. A pressure sensor for detecting an electric arc in an electrical switchboard comprising:

an enclosed case containing an opening, the case being placed in the switchboard wherein the opening in the case is conical in shape, the opening on the exterior face of the case being larger than the opening on the interior face of the case thereby allowing the air to enter the case more easily than the air can exit the case through the opening;

a pressure switch attached to the interior of the case;

means for transmitting a signal when a contact in the pressure switch is closed, the transmitting means electrically connected to the pressure switch; and means for receiving the signal and turning off the source of electricity;

whereby air comprising a pressure wave created by the electric arc enters the case through the opening forcing a contact on the pressure switch to close thereby completing a circuit with the transmitting means and transmitting the signal to the receiving means to turn off the source of electricity and quench the electric arc.

3. The sensor as recited in claim 2, the sensor further comprising means for connecting the pressure switch to the air pressure outside of the switchboard thereby allowing the pressure switch to measure the difference between the air pressure inside and outside of the switchboard.

4. The sensor as recited in claim 3, wherein the air pressure caused by the electric arc will be detected when it reaches approximately 0.05% of the air pressure outside of the switchboard.

5. The sensor as recited in claim 3, the means for connecting comprising means for attaching the case to an exterior wall of the switchboard, the attaching means extending through the case and the exterior wall of the switchboard and having a hollow passage permitting air to enter the pressure switch.

6. The sensor as recited in claim 5, the attaching means further comprising a vent cap placed on the end of the attaching means that extends through the exterior wall of the switchboard, the vent cap having a vent opening to allow air to enter the hollow passage, the vent opening having a diameter and shape to prevent the entry of water and contamination.

7. A method for detecting an electric arc inside an electrical switchboard using a pressure sensor, the method comprising:

placing an enclosed case containing an opening in the switchboard wherein the opening in the case is conical in shape, the opening on the exterior face of the case being larger than the opening on the interior face of the case thereby allowing the air to enter the case more easily than the air can exit the case through the opening;

attaching a pressure switch to the interior of the case;

transmitting a signal when a contact in the pressure switch is closed; and receiving the signal and turning off the source of electricity;

whereby air comprising a pressure wave created by the electric arc enters the case through the opening forcing a contact on the pressure switch to close thereby completing a circuit and transmitting the signal to turn off the source of electricity and quench the electric arc.

8. The method as recited in claim 7, the method further comprising connecting the pressure switch to the air pressure outside of the switchboard thereby allowing the pressure switch to measure the difference between the air pressure inside and outside of the switchboard.

9. The method as recited in claim 8, further comprising detecting the air pressure caused by the electric arc when the air pressure reaches approximately 0.05% of the air pressure outside of the switchboard.

10. The method as recited in claim 8, the connecting the pressure switch step comprising attaching the case to an exterior wall of the switchboard and permitting air to enter the pressure switch through a hollow passage in the case and the exterior wall of the switchboard.

11. The method as recited in claim 10, the permitting the air to enter the pressure switch step further comprising capping the exterior end of the hollow passage, the cap having an opening allowing air to enter and having a diameter and shape to prevent the entry of water and contamination.

* * * * *